C. A. BECKER.
BALANCE.
APPLICATION FILED FEB. 17, 1921.

1,404,426.     Patented Jan. 24, 1922.

Inventor
Christopher A. Becker,
By his Attorneys
Fraser, Turk & Myers

UNITED STATES PATENT OFFICE.

CHRISTOPHER A. BECKER, OF NUTLEY, NEW JERSEY, ASSIGNOR TO THE TORSION BALANCE COMPANY, OF NEW YORK, N. Y., A CORPORATION OF NEW YORK.

BALANCE.

1,404,426.  Specification of Letters Patent.  Patented Jan. 24, 1922.

Application filed February 17. 1921. Serial No. 445,814.

*To all whom it may concern:*

Be it known that I, CHRISTOPHER A. BECKER, a citizen of the United States of America, residing in Nutley, in the county of Essex and State of New Jersey, have invented certain new and useful Improvements in Balances, of which the following is a specification.

This invention relates to weighing scales or balances, and particularly to such encased balances as are applied to very fine or delicate weighing, such as are used by analysts, jewelers and others who have occasion to weigh objects or quantities of light weight and with great accuracy. Such scales or balances are commonly constructed with a balance beam hung at its middle upon a knife edge, and having scale pans hung from its ends, all enclosed within a case to protect the movable parts from disturbance by air currents. In one pan, the article to be weighed is placed, and in the other the operator places weights, until the scale reaches poise. Sometimes, a slide weight or rider is provided on either side of the beam, which can be slid along a graduated part thereof, instead of the use of separate weights, or supplemental thereto, or a hanging chain may be employed as in the "chainomatic balance." Means are usually provided for raising and maintaining the scale beam off its knife edge when the balance is not in use, and also to bring said beam to a level position preparatory to bringing the balance to poise. The means employed for this purpose are of various constructions, and it is one of the objects of the present invention to generally improve upon said means.

Another object of the invention is to devise said means so that, when raising the scale beam from its central knife edge support, and the pan supports from the end knife-edges of the scale beam, especially when the balance is out of poise, no lateral shifting of said knife edges with relation to their bearing surfaces will be permitted.

Certain other features of improvement and combination of parts are contemplated, as will be hereinafter more fully set forth.

Referring to the drawings, which illustrate the preferred embodiment of the invention:

Figure 1:
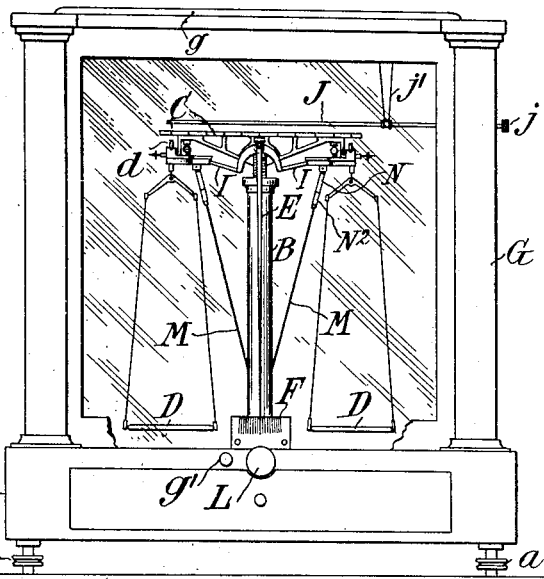
Figure 1 is a front elevation of a laboratory balance, with its enclosing casing.

The particular balance shown in Fig. 1 is selected merely for the purpose of illustrating the invention. The construction shown has a base A, with suitable leveling screws $a$, and, projecting upwardly from this base, is a central column B, on top of which, through the usual knife edge mounting, is supported or hung the balance beam C having arms of equal length, from the ends of which, through the usual knife edge supports, are suspended the scale pans D, or any other means whereby the objects to be weighed, or any counterbalancing weights, are to be suspended from the beam.

The balance beam C, which may be of any preferred construction, may be provided with the usual adjustments, such as the screw threaded stems $c'$, carrying the adjustment nuts $c^2$, extending from the ends of said beam, and any other adjusting means employed for increasing the accuracy of the balance. The beam is shown provided with a long pointer E, traversing graduations on a suitable plate F, to indicate when the balance comes to poise. The balance is provided with means for bringing the beam to a level and lifting it slightly off its knife edge fulcrum, preparatory to and after the weighing operation is completed, and the specific means herein disclosed constitutes the subject matter of the present invention. These means will be hereinafter explained in detail. Prior to entering into a detailed description of these means, the various other parts of the balance, as usually constituted, will be first described, but which form no part of the present invention, excepting insofar that they cooperate to produce a balance of high precision.

The balance, with all its appurtenances, is usually enclosed within a glass case G, having sides of glass and a sliding front door $g$, which is shown closed in Fig. 1. The balance beam C, when supported on its central knife edge, rests on the agate or other suitable bearings H, mounted in the top of an extension B′ on the column B, and said extension B′ carries a beam arrest or beam lifter for raising the beam slightly off its fulcrum support when it is not actually required to obtain poise of balance. As herein disclosed, the beam arrest comprises a pair of angled arms I, of equal length, pivoted at their adjacent ends to the extension B′, as at $i$. These angled arms carry, at their free ends, V-shaped grooved stirrups $i^2$ for lifting and holding the knife edge bearings $d$, which are adapted to rest on the end knife edges of the beam, off said knife edges when not in use. For the purpose of decreasing the weight of the beam arrest arms, without materially detracting from their strength and rigidity, they are provided, at their adjacent ends, with forked arms $i^3$ (shown in Fig. $3^3$), which are pivoted to each other and to the supporting extension on the column on pivots, the centers of which are in axial alignment, and coincide with the plane of the bearings H. Adjacent the stirrup supports $i^2$, the arms are provided with ball shaped projections $i^4$, which are outwardly adjustable with respect to the arm bases. It is these projections which are adapted to engage a suitable receptacle $c^3$ and a guide $c^4$ on the balance beam, to properly position, raise and hold said beam off its central knife edge. The extreme ends of the beam arrest arms, which are provided with the stirrups $i^2$, are likewise of forked construction, and it is within the spaces provided by these forked arms that the ends $c^5$ of the balance beam move. These ends carry the knife edges, which are adapted to be brought into or out of engagement with the bearing carrying stirrups $d$, which support the pans D. To provide a refinement to the weighing operation, the balance beam C may be provided with graduations $c^6$, and a suitable rider provided which is adapted to move and seat upon said beam at various positions. A rider, if used, may be carried and moved from place to place along the beam by a suitable rider carrier associated with a slide rod J, operable from outside the casing by the button $j$, the said rod being supported within the casing by the stirrup $j^1$. Beneath each of the pans D, a suitable pan lifter (not shown) is positioned, and said pan lifters are operable through the button $g'$ at the face of the casing.

The specific improvement in balances contemplated by the present invention is the means for operating or raising the beam arrest or beam lifters, and, as herein disclosed, comprises the slide member K, the thumb wheel L, the divergent rods M, and the fastening means N.

The slide member K consists of a rod of circular or other suitable cross section, and is adapted to be moved vertically upward or downward within the column B, by means of a turning movement of the thumb wheel L, located on the outside of the casing. This turning movement is translated into a vertical movement, in any known way, as through the agency of the link $k$ pivoted to the base of the slide member K, and its connection with a suitable crank, cam or eccentric associated with the thumb wheel L. However, any suitable means may be employed for giving to the slide member K its vertical movement. At an appropriate point intermediate its length, the slide member K pivotally supports the rods M about a common pivot or axis, indicated in the drawings by the letter O. This pivotal connection between the rods and slide being adjacent the ends of the rods, suitable means are provided upon both the slide and the column, to permit of this action. As disclosed, the slide has wide cutaway V's cut in its length, and the column has longitudinal slots $b$ in its sides for said purpose. The opposite ends of the rods M are screw-threaded, as at M′, and upon said screw-threaded ends are mounted a longitudinally split sleeve N, provided with a flattened eye extension N′, and a nut $N^2$. The function of said sleeve and nut is to adjustably vary the length of the rods and hold them in adjusted position. In this respect, the nut $N^2$ acts as a lock nut in cooperating with the longitudinally split sleeve N. When said sleeve and nut are properly adjusted with respect to the rods, they form the equivalent of rods having a flattened end provided with an opening therein. These rods are pivotally connected with the beam arrest arms by engaging between forked depending lugs I′ thereon, although any other suitable means of connection between these parts may be provided.

As thus constituted, there is provided a pivoted connection between the slide and the rods at O; between the rods and the beam arrest arms at I′, and between said arms at $i$, and, by turning the thumb wheel L, the beam arrest arms I are caused to move through an arc of a circle. In so moving, the projections $i^4$ simultaneously engage the receptacle $c^3$ and guide $c^4$ on the balance beam, to lift it off its knife edge fulcrum, if said beam be in a level position, and, if in a non-level position, one arm I acts to first move it, together with its bearing carrying stirrups $d$, supported on the end knife edges, through an appropriate arc about its central knife edge as a pivot, until a level position is reached, whereupon it is bodily lifted by the simultaneous action of the projections on both beam arrest arms. The movement of said arm lifter $i^2$ and the beam through the same arc, all being pivoted about a common axis, precludes any possible lateral shifting of the beam or bearing carrying stirrups, and, consequently, prevents the dulling of the knife edges in rubbing over their agate or other hard bearings.

Figure 6:
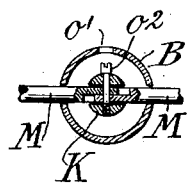
Fig. 6 is a cross section, taken on line 6—6 of Fig. 4.
Figure 5:
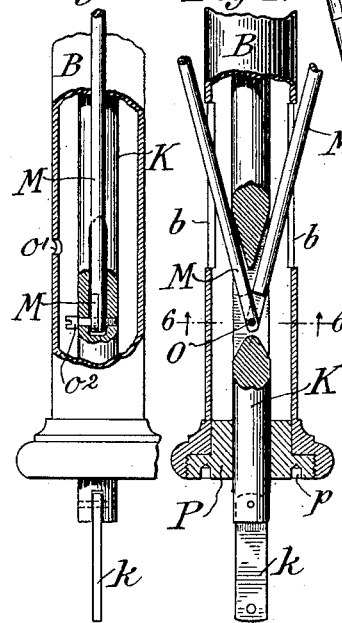
Fig. 5 is a similar view, taken at right angles thereto.
Figure 4:
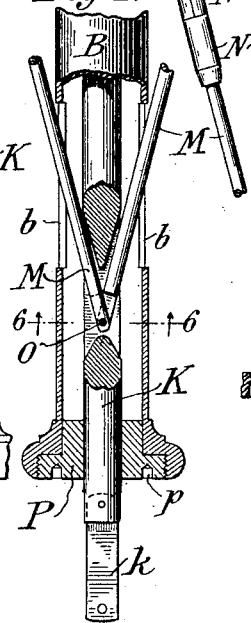
Fig. 4 is a fragmentary longitudinal section of the column, showing the connection between the slide member and the divergent rods.
Figure 2:
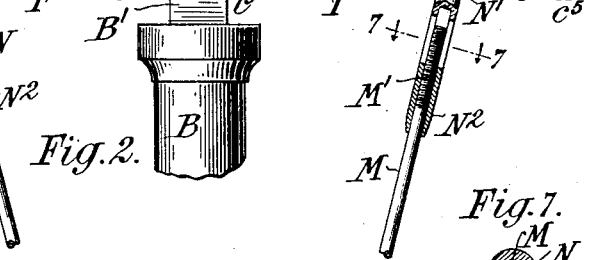
Fig. 2 is a fragmentary front elevation of the scale beam, the beam arrest, mounted on the column, and its connection with the divergent rods.
Figure 7:
Fig. 7 is a cross section, taken on line 7—7 of Fig. 2.
Figure 3:
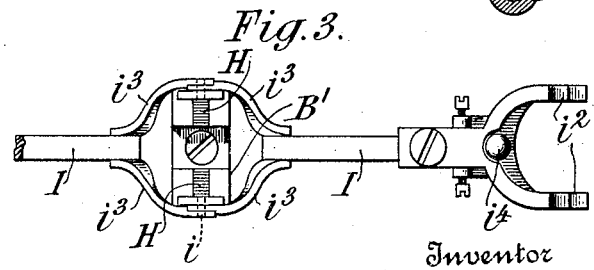
Fig. 3 is a top elevation of a major portion of the beam arrest.

In assembling the rods in relation to the slide member, the slide K is held in position within the column, so that the pivot opening therein is opposite the opening O' in the column. The rods M are then inserted through the slots $b$ in the column, so that its openings overlap, and are in alignment with the other openings, and the screw $O^2$ is then threaded into the slide member, as clearly shown in Fig. 6. To properly guide the movement of the slide member with relation to the wall of the column, a screw plug P, having a central guide opening, is threaded into the base of the column, and caused to seat flush therewith, through the use of a spanner wrench engaging the sockets $p$ therein. The column is mounted and held in position on the base plate by suitable fastening means passing through the base plate and engaging in the plug P (not shown).

While I have shown and described one embodiment of the invention, it will be understood that I do not wish to be limited thereto, since various changes can be made therein, without departing from the spirit of the invention.

1. In a balance or the like, the combination of a column and beam arrest, and means for operating said beam arrest, comprising a slide member movable within said column, a pair of divergent rods pivoted, adjacent one end, to said slide member, about a common pivot, and pivoted, adjacent the other end, to said beam arrest.

2. In a balance or the like, the combination of a column and beam arrest, and means for operating said beam arrest, comprising a slide member movable within said column, a pair of divergent rods pivoted, adjacent one end, to said slide member, and pivoted, adjacent the other end, to said beam arrest.

3. In a balance or the like, the combination of a column and beam arrest, and means for operating said beam arrest, comprising a slide member movable within said column, a pair of divergent rods pivoted, adjacent one end, to said slide member, and pivoted, adjacent the other end, to said beam arrest, the length of said rods being adjustable.

4. In a balance or the like, the combination of a column and beam arrest, and means for operating said beam arrest, comprising a slide member movable within said column, a pair of divergent rods pivoted, adjacent one end, to said slide member, about a common pivot, and pivoted, adjacent the other end, to said beam arrest, the length of said rods being adjustable.

5. In a balance or the like, the combination of a column and a beam arrest, consisting of a pair of pivotally connected arms, and means for operating said arms, comprising a slide member movable within said column, a pair of adjustable rods connected to said slide member, at one end, and a pivotal connection between said arms and the other ends of said rods.

6. In a balance or the like, the combination of a column and a beam arrest, consisting of a pair of pivotally connected arms, and means for operating said arms, comprising a slide member movable within said column, longitudinal openings in said column, a pair of adjustable rods passing through said openings, and connected to said slide member at one end, and a pivotal connection between said arms and the other ends of said rods.

7. A balance or the like, comprising a beam arrest, and means for operating said beam arrest, comprising a vertically movable slide member, means for moving said slide member, and a pair of divergent rods associated with said slide member, and having a pivotal connection with said beam arrest.

8. A balance or the like, comprising a beam arrest, and means for operating said beam arrest, comprising a vertically movable slide member, means for moving said slide member, and a pair of divergent rods pivotally connected with said slide member upon a common axis, and having a pivotal connection with said beam arrest.

9. A balance or the like, comprising a beam arrest consisting of a pair of pivotally connected arms, and means for simultaneously moving said arms, said means comprising a vertically movable slide member, means for actuating said slide member, a pair of divergent rods, pivotally connected at one end with said slide member about a common axis, and, at the opposite end, being pivotally connected to the beam arrest arms.

10. A balance or the like, comprising a beam arrest consisting of a pair of pivotally connected arms, and means for simultaneously moving said arms, said means comprising a vertically movable slide member, means for actuating said slide member, a pair of divergent rods, pivotally connected at one end with said slide member about a common axis, and, at the opposite end, being pivotally connected to the beam arrest arms, and the length of said rods being longitudinally adjustable.

In witness whereof, I hereunto sign my name.

CHRISTOPHER A. BECKER.